United States Patent
Wang et al.

(10) Patent No.: US 7,801,442 B2
(45) Date of Patent: Sep. 21, 2010

(54) REDUNDANT CHANNEL IMPLEMENTATION TO EXTEND OPTICAL TRANSCEIVER LIFETIME AND RELIABILITY

(75) Inventors: Frank Wang, Sunnyvale, CA (US); Darren Crews, Santa Clara, CA (US); Lee Xu, Cupertino, CA (US); Graham Flower, San Jose, CA (US); Miaobin Gao, Saratoga, CA (US); Chien-Chang Liu, Sunnyvale, CA (US); Jesse Chin, Saratoga, CA (US); Brian Kim, Fremont, CA (US); William Wang, Pleasanton, CA (US); Guobin Liu, San Luis Obispo, CA (US); Xiaojie Xu, Superior, CO (US); Thiri Lwin, Fremont, CA (US); Yousheng Wu, San Jose, CA (US); Simon Lee, II, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 647 days.

(21) Appl. No.: 11/648,491

(22) Filed: Dec. 28, 2006

(65) Prior Publication Data

US 2008/0273880 A1 Nov. 6, 2008

(51) Int. Cl.
*G02F 1/00* (2006.01)

(52) U.S. Cl. .................................. 398/5; 398/2; 398/3
(58) Field of Classification Search ................... 398/10, 398/17, 19, 12, 5, 4, 2, 3, 22, 30, 33, 45, 398/79, 135, 139, 141, 23
See application file for complete search history.

(56) References Cited

U.S. PATENT DOCUMENTS

| 6,195,075 | B1 * | 2/2001 | Shino et al. | ............... 345/68 |
| 7,099,578 | B1 * | 8/2006 | Gerstel | ............... 398/5 |
| 7,233,738 | B2 * | 6/2007 | Kerfoot, III | ............... 398/10 |
| 2006/0104646 | A1 * | 5/2006 | Schrodinger | ............... 398/192 |

* cited by examiner

*Primary Examiner*—Hanh Phan
(74) *Attorney, Agent, or Firm*—Kevin A. Reif

(57) ABSTRACT

Embodiments introduce redundant optical channels to significantly extend the lifetime of parallel optical transceivers. A plurality of transmitters, N, transmit on a plurality of optical channels, where N is an integer number of optical channels greater than 1. One or more redundant channels, M, are also provided. N+M multiple input shift registers provide multiple paths for signals from each of the transmitters to connect to N+M laser diodes. In the event up to M of the N+M laser diodes fail, the multiple input shift registers connect the N transmitters to functioning ones of the N+M laser diodes thus extending the life of the device. A corresponding scheme is also described for the receiver side.

20 Claims, 4 Drawing Sheets

REDUNDANT CHANNEL IMPLEMENTATION TO EXTEND OPTICAL TRANSCEIVER LIFETIME AND RELIABILITY

FIELD OF THE INVENTION

Embodiments of the present invention relate to optical transceivers and, more particularly to optical transceivers having redundant optical channels.

BACKGROUND INFORMATION

Lasers are used in a wide variety of applications. In particular, lasers are integral components in optical communication systems where a beam modulated with vast amounts of information may be communicated great distances at the speed of light over optical fibers.

Of particular interest is the so-called vertical cavity surface emitting laser (VCSEL). As the name implies, this type of laser is a semiconductor micro-laser diode that emits light in a coherent beam orthogonal to the surface of a fabricated wafer. VCSELs are compact, relatively inexpensive to fabricate in mass quantities, and may offer advantages over edge emitting laser which currently comprise the majority of the lasers used in today's optical communication systems. The more traditional type edge emitting laser diodes emit coherent light parallel to the semiconductor junction layer. In contrast, VCSELs emit a coherent beam perpendicular to the boundaries between the semiconductor junction layers. In other words, VCSELs emit a beam in a vertical direction from the substrate as opposed to emitting a beam in the same plane as the substrate. Among other advantages, this may make it easier to couple the light beam to an optical fiber and may be more efficient.

VCSELs may be efficiently fabricated on wafers using standard microelectronic fabrication processes and, as a result, may be integrated on-board with other components. VCSELs may be manufactured using, for example, aluminum gallium arsenide (AlGaAs), gallium arsenide (GaAs), indium gallium arsenide nitride (InGaAsN), or similarly suited materials. VCSELS have been successfully manufactured in 850 nm, 1310 nm and 1550 nm ranges. This allows for a wide variety of fiber optic applications ranging from short reach applications to long haul data communications. VCSELs are promising to advance optical communication systems by providing a fast, inexpensive, energy efficient, and more reliable source of laser beam generation.

VCSELs are low cost laser which has been widely used in the optical transceivers. One of the challenges is the reliability of VCSEL. For example, it is estimated that the cumulative failure percentage for a 850 nm VCSEL may be about 2.33% at 12624 hours (1.44 years) with burn-in condition (100° C. and 20 mA). Even with low forward drive current (e.g. 10 mA DC) and low temperature (e.g. 40° C.), the cumulative failure rate is still about 1% around 11.4 years for the VCSEL built in the last decade. As a practical matter, the failure rate is likely much higher since typical operation conditions in the real world is about 18 mA AC driving current at 60-70° C. At 70° C., the cumulative failure rate is a factor of 8.4 lower than 40° C., which is about 1% at 1.35 years.

As the industry drives the communication bit rate faster and faster, VCSEL arrays were built for parallel optical transceivers, which made it even harder to control the quality and reliability. On other hand, the VCSELs are typically driven harder to boost the high speed performance, which dramatically reduces the VCSEL lifetime.

DETAILED DESCRIPTION

Figure 1:
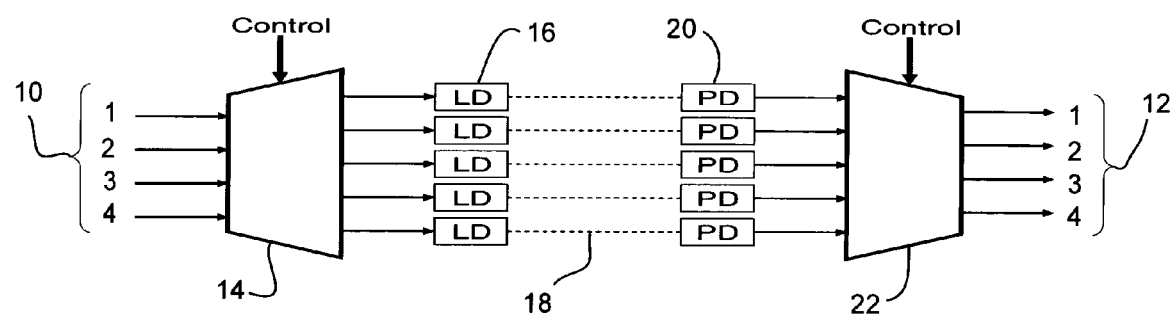
FIG. 1 is a diagram of a four channel optical transceiver with one redundant channel.

Referring now to FIG. 1, there is shown a simple four channel optical transceiver having one redundant channel. There are four input channels 10 and four output channels 12. A 4:5 multiplexer (MUX) 14 can direct any one of the four input channels 10 to any four of the laser diodes (LD) 16 with, for example, the fifth channel 18 being redundant. Likewise, on the receiver side an optical signal may be received by a corresponding photodiode (PD) 20 and there after directed to a 5:4 MUX 22 and onto the four output channels 12.

Adding one redundant channel in a four-channel transceiver system results in five optical channels. A laser 16 failure can be determined by detection of received signal strength of a photodiode 20 in real time. To bypass the failed channel, there should be dynamic flexibility on both transmitter and receiver sides. Ideally, the additional redundant channel should exhibit the same properties as the regular channels, e.g. equal loading at input and output nodes. As illustrated in FIG. 1, it is possible to realize the dynamic flexibility by conventional 4×5 and 5×4 multiplexers, 14 and 22, that allow each input path to be directed to any output path; however, the heavy loading on the output nodes may prevent them from high-speed operations.

Figure 2:
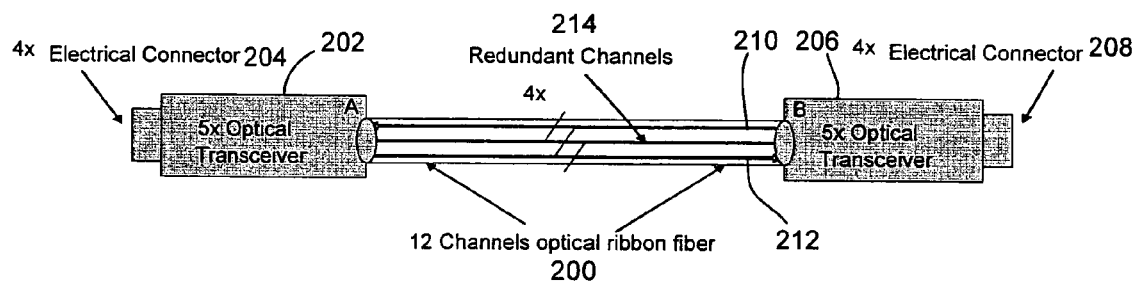
FIG. 2 is a block diagram of a 4× optical cable.

Embodiments introduce a redundant optical channel to significantly extend the lifetime of parallel optical transceivers. FIG. 2 shows a block diagram of a 4× optical cable. This optical cable may be used, for example, in InfiniBand fabric. InfiniBand is a switched fabric communications link primarily used in high-performance computing. Its features include quality of service and failover, and it is designed to be scalable. The InfiniBand architecture specification defines a connection between processor nodes and high performance I/O nodes such as storage devices. It can be used to connect servers (end nodes), switches and routers with great distance. At the 4× case, there are 4 input channels and 4 output channels.

High-speed serial data may be run through each channel at 2.5 Gbps for SDR (Single Data Rate) and 5.0 Gbps for DDR (Double Data Rate). In this example, we use a vertical cavity surface emitting laser (VCSEL) based parallel optical transceiver (5 channels) in Intel InfiniBand optical cable and the fifth optical channel is used as redundant channel.

As illustrated in FIG. 2, a ribbon optical fiber 200 having 12 channels connects a pair of 5× optical transceivers, 202 and 206. The first 5× optical transceiver 202 on side A of the ribbon optical fiber ribbon cable 200 is connected to a 4× electrical connector 204. The second 5× optical connector 206 on side B of the optical fiber ribbon cable 200 is also connected to a 4× electrical connector 208. Within the optical fiber ribbon cable 200 channels 1-4 (210) may be used as regular receiver channels, channels 9-12 (212) may be used as regular transmitter channels. Of the remaining channels 5-8 (214), channels 5 and 8 may be used as redundant channels and channels 6 and 7 may be used as control channels. By measuring a received signal strength indicator (RSSI) signal built in a PIN photodiode in the transceiver, 204 or 206, or loss of signal (LOS) indicator, a VCSEL failure may be detected in either of the transceivers, 204 or 206, such that a data stream may be redirected to one of the redundant channels 5 or 8.

Figure 3:
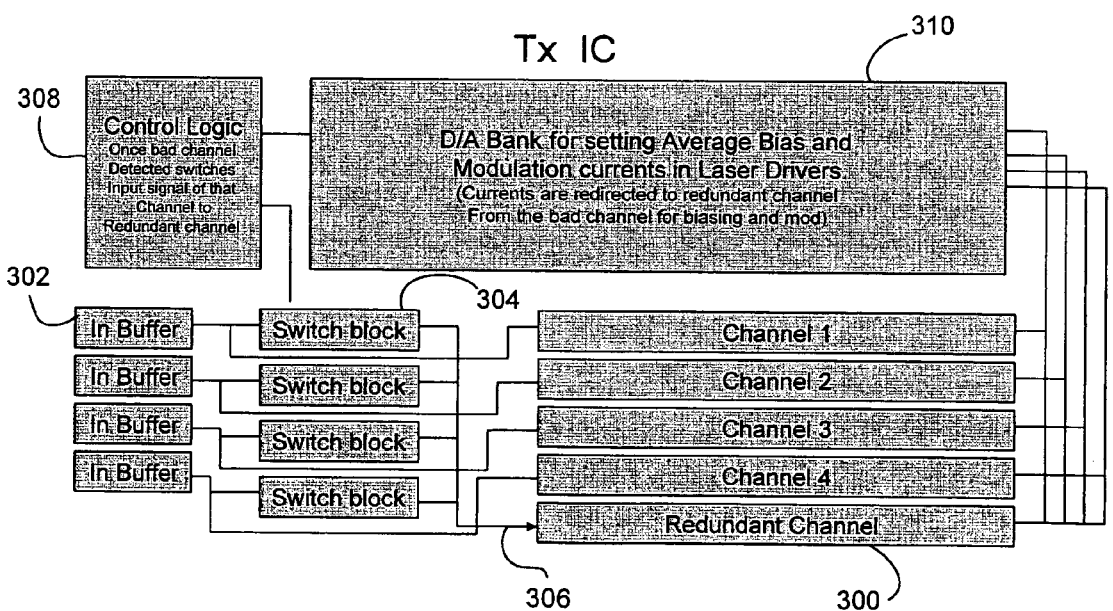
FIG. 3 is a block diagram of a 5-channel laser driver for implementing the redundant channel in the event a channel fails.

FIG. 3 shows a 5-channel laser driver for implementing the redundant channel in the event a channel fails. This is given for the case of a transmitter within either of the transceivers, 202 or 206 shown in FIG. 2. Of course one of skill in the art would recognize this would be similar for corresponding receiver circuitry. As shown, a plurality of channels are used, labeled channels 1-4, with a fifth channel provided as a redundant channel 300. Each of channels 1-4 have a corresponding input buffer 302 and switch block 304 associated therewith. Once a bad or failed channel 1-4 is detected by control logic 308, such as in the case of laser failure, the switch blocks 304 may take the data from anyone of the input buffers 302 and redirect it on with a connection 306 to the redundant channel 300.

The digital/analog bank 310 sets average bias current and modulation currents in laser drivers. The bank 310 is shown connected between the channels 1-4 and the redundant channel 300 and the controller 308. Once a failure is detected a signal is sent indicating that there is a failure involving a particular channel 1-4. Control logic 308 may then shutdown the circuitry for the failed channel 1-4 and a switch block 304 redirects a signal coming in from the input buffer 302 of that channel to the redundant channel 300. Similarly the D/A bank 310 which inputs the bias and modulation signals to the failed laser driver circuit are redirected to the output driver of the redundant channel 300 by a switch 304. Once a fault is detected the bias circuitry for the redundant channel is turned on and the bias circuitry for the back end of the failed channel is turned off. In this way the only difference in performance of the chip from the original is the current running in the switch cell buffer of the failed channel. In this manner the redundancy implementation can have a minimal effect on overall power dissipation.

The implementation of redundant channel is not limited to above 4× Intel InfiniBand optical cable, as it may be easily apply the idea to 12× optical cable and any other parallel optical transceivers. The general approach has following two steps, with a few possible approaches illustrated for each of the steps.

Step 1. How to detect the failure of VCSEL
  Integrated PIN on the VCSEL to detect the VCSEL failure;
  Separated PIN to detect the VCSEL failure;
  RSSI;
  High speed implementation (detailed in above 4× InfiniBand optical cable case);
  Low speed implementation: In 4× case, use channel 6 and 7 as low speed communication channel to let both sides know the failure channel of VCSEL. Redirect the data stream to redundant channels (5, 8) and shutdown the bad channel;
  AC check: measure the optical modulation amplitude on the receiver side;
  DC check: check the optical average level on the receiver side;
  Customer board feedback: customer board send the signal to transceiver about the failure channel;
  LOS: by measuring loss of signal (LOS) of all receivers on both sides;
  Detecting VCSEL voltage change;

Step 2. How to reconstruct the redundant channel and redirect the data stream to the redundant channels:
  With redundant optical fiber
  Without redundant optical fiber
    a. Multiple channels (2) working simultaneously to the same fiber (turn on the backup channel only if working one dies.)
    b. Multiple channels (2) working simultaneously to the same fiber,
    c. When one channel dies, you re-configure another channel for multi-level coding and recover the signal.
    d. Higher data rate for each channel so if one channel dies the signal still will be recovered
    e. In a WDM (wavelength division multiplexed) system, an extra wavelength may be added.

Here, we illustrate the detailed implementation with LOS for 4× InfiniBand case.

The redundant channel enable control bit_R=LOS_1∥LOS_2∥LOS_3∥LOS_4,

The Tx data for redundant channel:
  Tx_R=(In_buffer_1 && LOS_1)∥(In_buffer_2 && LOS_2)
  ∥(In_buffer_3 && LOS_3)∥(In_buffer_4 && LOS_4).

The Rx data:
  if LOS_i==1 then out_buffer_i=Rx_r else out_buffer_i=Rx_i, where i=1, 2, 3, 4

Here 1, 2, 3 and 4 are channel numbers. And in_buffer and out_buffer are serial electrical input and out data streams to or from the InfiniBand optical cable. Tx_r and Rx_r are serial input and output of redundant channel. In this implementation, the redundant channel turns on only when at least one LOS is on.

Generally, the possibility to have multiple channel failure is much lower than single channel failure. So the single redundant channel is sufficient to extend the lifetime of whole optical transceiver.

Figure 4A:
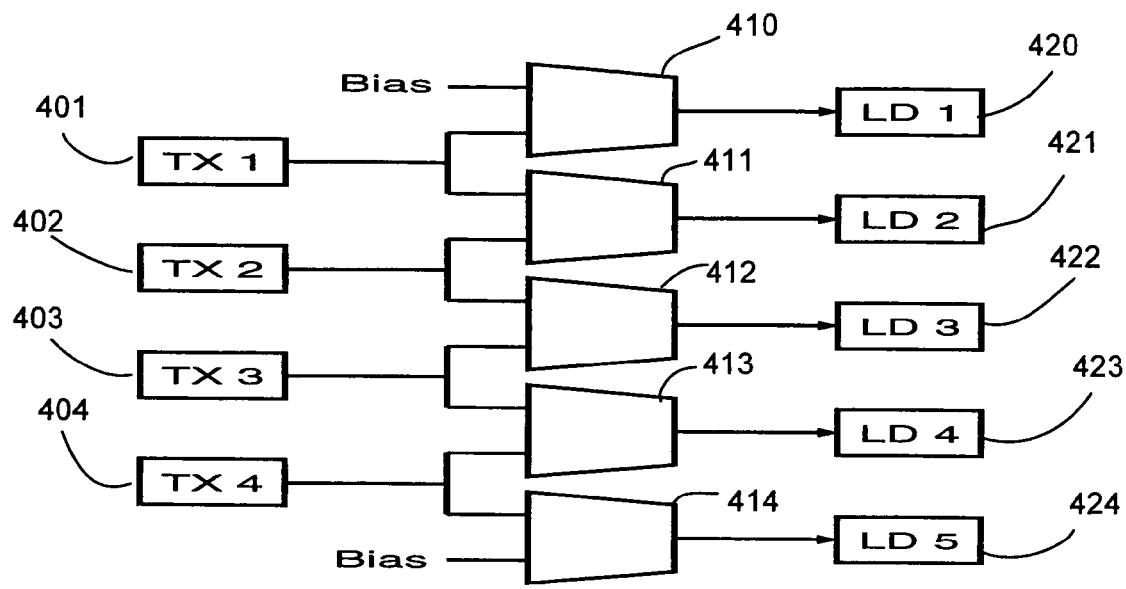
FIG. 4A is a block diagram of a four channel optical transmitter with one redundant channel.

FIG. 4A shows a multiple channel transmitter according to one embodiment. Four channels are shown, but one skilled in the art will readily recognize that fewer or greater numbers of channels may be employed. As shown, there are four transmitters TX1-TX4 labeled 401, 402, 403, and 404, respectively. Each may be connected to two of five 2×1 multiplexers 410, 411, 412, 413, and 414. For example, the output of TX1 401 is the input to MUX 410 and 411. The output of TX2 402 is the input to MUX 411 and 412. The output of TX3 403 is the input to MUX 412 and 413. Finally, the output of TX4 404 is the input to MUX 413 and 414. The outputs of the MUXes 410-414 comprises 5 channels connected to five laser diodes LD1-LD5, labeled 420, 421, 422, 423, and 424, respectively. Each 2×1 multiplexer 410-414 simply forwards one of its input signals to its respective laser diode LD1-LD5 and ignores the other input signal. Controlled by appropriate switching signals, the four signals from the TX1-TX4 may be directed to four of the optical channels, for example 420-423, leaving the remaining channel LD5 424 redundant. In the event of a laser failure, LD1-LD5, the signal from one or more of the transmitters may simply be switch or shifted to be directed to a different laser diode.

For example, if LD4 423 fails then MUX 414 can simply switch the signal output by TX4 404 to working LD5 424. If, for example LD2 421 fails, then MUX 412 can switch the output signal from TX2 402 to LD3 422, MUX 413 can output the signal from TX3 403 to LD4 423, and MUX 414 can switch the signal output by TX4 404 to working redundant LD5 424. In this manner all of the channels at and below a failed laser may be shifted to an adjacent channel allowing the device to continue to operate.

Figure 4B:
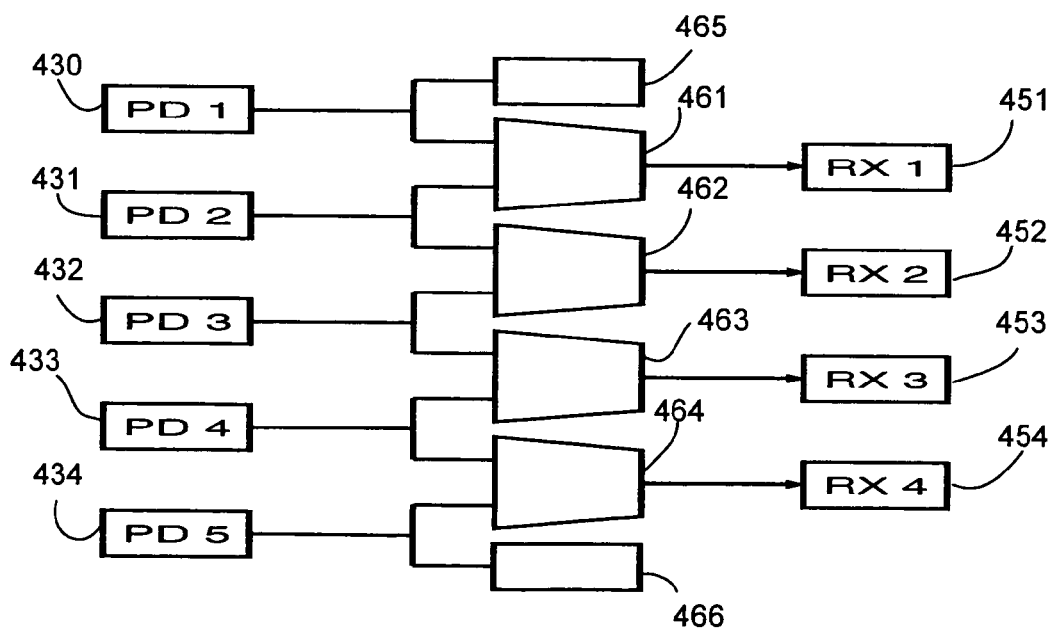
FIG. 4B is a block diagram of a four channel optical receiver with one redundant channel.

FIG. 4B shows a multiple channel receiver according to one embodiment. The receiver may be paired with the transmitter to form a transceiver according to embodiments. Five photo detectors PD1-PD5, labeled 430, 431, 432, 433, and 434, correspond to receive a light signal from a respective laser diode, LD1-LD5 shown in FIG. 4A. The outputs of each photodiode, PD1-PD5 is input to two 2×1 MUXes 461, 462, 463, and 464. In order to balance the loads, the photodiodes on either end, PD1 and PD5, has its output split between a MUX (461 or 464) and a dummy cell 465 or 466. The dummy cells may be used to equalize the loading experienced by each input signal path.

The outputs of the MUXes 461-464 comprise four channels each feeding to a receiver RX1-RX4, labeled 451, 452, 453, and 454, respectively. Again, controlled by appropriate switching signals, the four signals from the PD1-PD5 may be directed to four of the optical channels, leaving the remaining photodiode redundant. The control signals to the 2×1 multiplexers in the transmitter 410-414 and in the receiver 461-463 may be realized by shift registers.

Figure 5A:
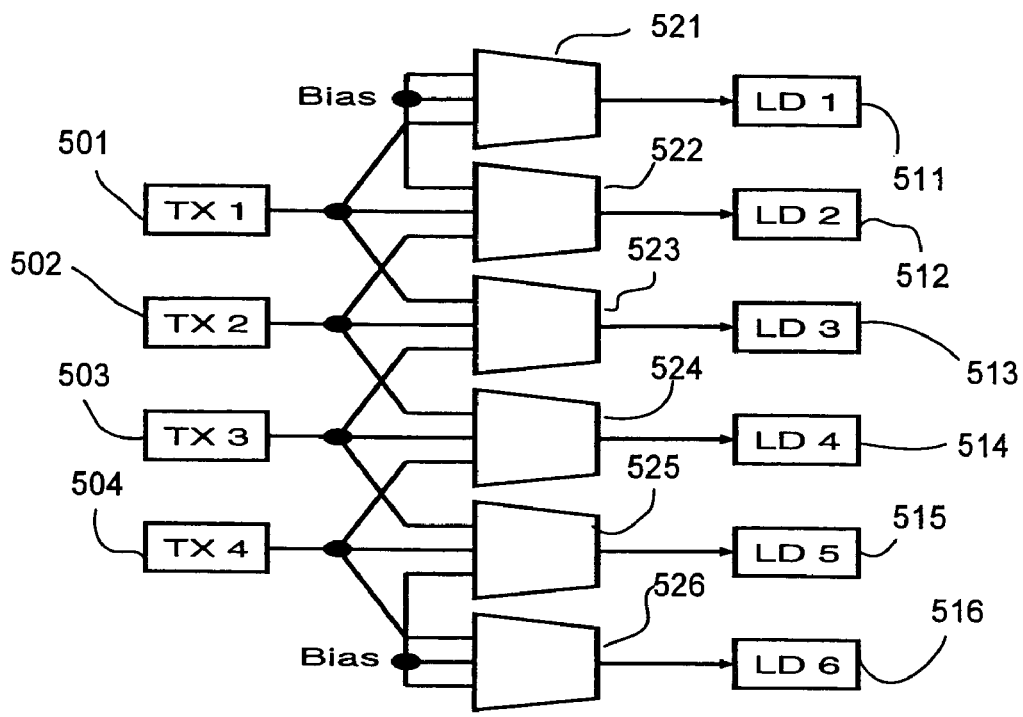
FIG. 5A is a block diagram of a four channel optical transmitter with two redundant channels.
Figure 5B:
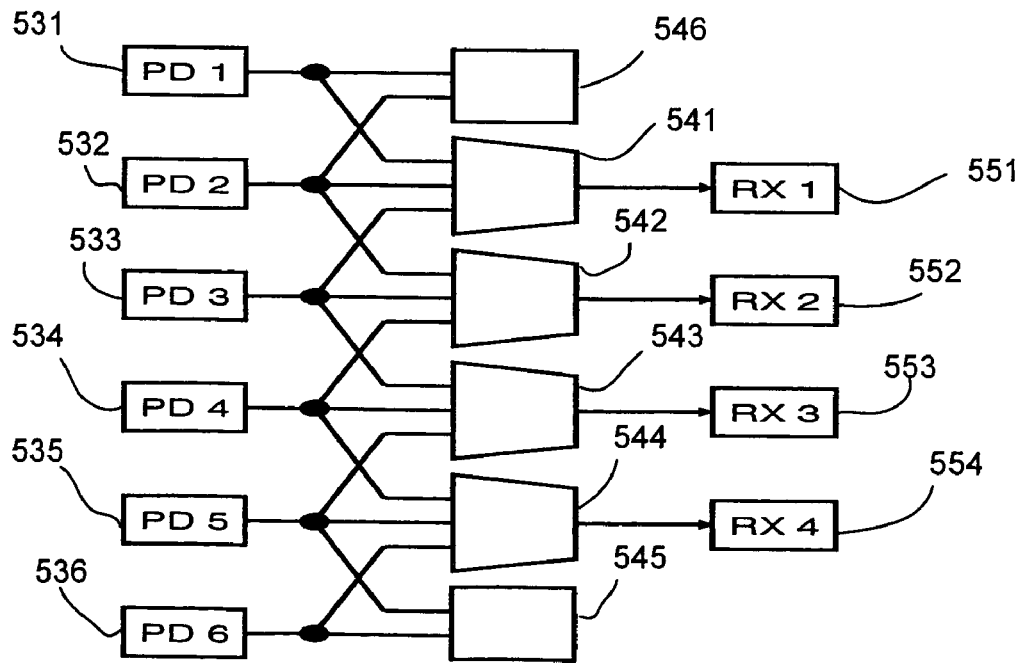
FIG. 5B is a block diagram of a four channel optical receiver with two redundant channels.

As shown in FIGS. 5A-5B, this scheme can be easily extended to support more regular channels and/or more redundant channels. The circuit shown in FIG. 5A is similar to that shown in FIG. 4A except that there are two redundant channels, rather than one. As before, there are four transmitters TX1-TX4, labeled 501, 502, 503, and 504, respectively. However, there are six laser diodes LD1-LD6, labeled 511, 512, 513, 514, 515, and 516, respectively. Also provided are six 3×1 MUXes or shift registers, 521, 522, 523, 524, 526, and 526 connected between the transmitters TX1-TX5 and the laser diodes LD1-LD3 which permits the possibility of each transmitter TX1-TX5 to connect to three of the laser diodes LD1-LD5. For example, TX1 may connect to any of LD1-LD3, TX2 may connect to any of LD2-LD4, TX3 may connect to any of LD3-LD5, and TX4 may connect to any of LD4-LD6. In this manner in the event any two of the laser diodes LD1-LD5 were to fail, the MUXes 521-526 may be controlled to route all of the transmitters TX-TX4 to the remaining functioning laser diodes.

FIG. 5B shows a receiver corresponding to the transmitter shown in 5A. The receiver may comprise six photodiodes PD1-PD6, labeled 531, 532, 533, 534, 535, and 536, respectively. Again four 3×1 MUXes or shift registers 541, 542, 543, and 544 provide a path to all four receivers RX1-RX4, labeled 551, 552, 553, and 554. As before, dummy cells 545 and 446 may be used at either end to provide load balancing.

As illustrated, the described multi-channel transceiver with redundant channels exhibits excellent scalability to support various numbers of regular and redundant channels. The loading is independent of the number of regular channels; it only grows linearly as the number of redundant channels, allowing high-speed operations. Nominally, the configuration exhibits the same input/output properties of each channel, minimizing performance deviation when switching from a regular channel to a redundant channel.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus comprising:
    N transmitters, where N is an integer number of optical channels greater than 1;
    N+M first multiple input shift registers, each of the transmitters to output a signal to at least two of the first multiple input shift registers, where M is a integer number of redundant optical channels; and
    N+M laser diodes each connected to an output of a corresponding N+M multiple input shift register,
    wherein when up to M of the N+M laser diodes fail, the first multiple input shift registers connect the N transmitters to functioning ones of the N+M laser diodes, wherein M<N.

2. The apparatus as recited in claim 1 wherein the first multiple input shift registers comprise 2×1 multiplexers (MUXes).

3. The apparatus as recited in claim 1 wherein the first multiple input shift registers comprise 3×1 multiplexers (MUXes).

4. The apparatus as recited in claim 1 wherein the lasers diodes comprise vertical cavity surface emitting lasers (VC-SELs).

5. The apparatus as recited in claim 1 further comprising:
    N+M photo detectors to receive a signal over an optical link from a corresponding one of said N+M laser diodes;
    N second multiple input shift registers each connected to receive an input from M+1 of the N+M photo detectors; and
    N receivers connected to an output of the N second multiple input shift registers.

6. The apparatus as recited in claim 5 wherein the second multiple input shift registers comprise 2×1 multiplexers (MUXes).

7. The apparatus as recited in claim 5 wherein the second multiple input shift registers comprise 3×1 multiplexers (MUXes).

8. The apparatus as recited in claim 5 further comprising dummy cells to receive as an input a signal from a first and a last of the N+M photo detectors for load balance.

9. The apparatus are recited in claim 5 wherein the optical link comprises a 4× optical cable.

10. A method, comprising:
    providing N transmitters, where N is an integer number of optical channels greater than 1;
    providing N+M first multiple input shift registers, each of the transmitters to output a signal to at least two of the first multiple input shift registers, where M is a integer number of redundant channels; and
    connecting N+M laser diodes to an output of a corresponding N+M multiple input shift register,
    wherein when up to M of the N+M laser diodes fail, the first multiple input shift registers connect the N transmitters to functioning ones of the N+M laser diodes, wherein M<N.

11. The method as recited in claim 10 wherein the first multiple input shift registers comprise 2×1 multiplexers (MUXes).

12. The method as recited in claim 10 wherein the first multiple input shift registers comprise 3×1 multiplexers (MUXes).

13. The method as recited in claim 10 wherein the lasers diodes comprise vertical cavity surface emitting lasers (VCSELs).

14. The method as recited in claim 10 further comprising:
providing N+M photo detectors to receive a signal over an optical link from a corresponding one of said N+M laser diodes;
providing N second multiple input shift registers each connected to receive an input from M+1 of the N+M photo detectors; and
providing N receivers connected to an output of the N second multiple input shift registers.

15. The method as recited in claim 14 wherein the second multiple input shift registers comprise 2×1 multiplexers (MUXes).

16. The method as recited in claim 14 wherein the second multiple input shift registers comprise 3×1 multiplexers (MUXes).

17. The method as recited in claim 14 further comprising dummy cells to receive as an input a signal from a first and a last of the N+M photo detectors for load balance.

18. The method are recited in claim 14 wherein the optical link comprises a 4× optical cable.

19. The method as recited in claim 14 further comprising:
detecting a failed laser diode with a received signal strength (RSSI) signal.

20. The method as recited in claim 14 further comprising:
detecting a failed laser diode by measuring los of signal (LOS).

* * * * *